(12) United States Patent
Davidovich et al.

(10) Patent No.: US 7,509,586 B2
(45) Date of Patent: Mar. 24, 2009

(54) METHOD AND SYSTEM OF CALCULATING FOCUS ON AN ITEM

(75) Inventors: Ehud Davidovich, Ramat Hasharon (IL); Assaf Gotlib, Ra'anann (IL)

(73) Assignee: Sightix Ltd., South Netumya (IL)

( * ) Notice: Subject to any disclaimer, the term of this patent is extended or adjusted under 35 U.S.C. 154(b) by 650 days.

(21) Appl. No.: 10/525,025

(22) PCT Filed: Aug. 18, 2003

(86) PCT No.: PCT/IL03/00686

§ 371 (c)(1), (2), (4) Date: Feb. 17, 2005

(87) PCT Pub. No.: WO2004/017296

PCT Pub. Date: Feb. 26, 2004

(65) Prior Publication Data

US 2006/0010401 A1    Jan. 12, 2006

Related U.S. Application Data

(60) Provisional application No. 60/404,133, filed on Aug. 19, 2002.

(51) Int. Cl.
*G06F 3/048*    (2006.01)
(52) U.S. Cl. .................. 715/767; 715/853; 715/854; 715/817; 715/802; 345/441; 707/102
(58) Field of Classification Search .................. 715/767, 715/853, 840; 707/102
See application file for complete search history.

(56) References Cited

U.S. PATENT DOCUMENTS

| | | | |
|---|---|---|---|
| 5,687,331 A | 11/1997 | Volk et al. | |
| 6,154,205 A | 11/2000 | Carroll et al. | |
| 6,189,019 B1 | 2/2001 | Blumer et al. | |
| 2003/0107591 A1* | 6/2003 | Jameson | 345/744 |
| 2003/0131016 A1* | 7/2003 | Tanny et al. | 707/102 |

OTHER PUBLICATIONS

Focus + Context views of world wide web nodes (C&C Research Laboratories; Sougata Mukherjea and Yoshinori Hara "Mukherjea") copyright 1997(From applicants IDS not mailed).*
(Focus + Plus control views of world wide nodes(C&C Research Laboratories; Sougata Mukherjea and Yoshinori Hara) pp. 187-196.*

(Continued)

*Primary Examiner*—William L Bashore
*Assistant Examiner*—Sherrot Keaton
(74) *Attorney, Agent, or Firm*—Pearl Cohen Zedek Latzer, LLP

(57) ABSTRACT

There are presented a method and system of calculating focus applied to an item (102) among a group of items (101). In embodiments of the invention a focus measurement is decayed from all items (101) and added to the focus item (102). In some embodiments, the focus applied to a focus item is diffused among other items related to the focus item. In some embodiments a display of a focus item and its related items (104) visually reflects their context measurements relative to other items.

28 Claims, 3 Drawing Sheets

OTHER PUBLICATIONS

International Search Report of International Application No. PCT/IL03/00686 mailed Jan. 13, 2004.

Focus+Context Views of World-Wide Web Nodes Sougata Mukherjea and Yoshinori Hara—C&C Research Laboratories, NEC USA Inc., San Jose, Ca, USA.

Visulizing Hierarchies Using a Modified Focus + Context Technique Richardo Andrade Cava and Carla Maria Dal Sasso Freitas—Federal University of Rio Grande do Sul, Computer Science Institute, porto Alegre, RS, Brazil.

A Focus+Context Technique Based on Hyperbolic Geometry for Visuallizing Large Hierarchies. John Lamping, Ramans Rao, and Peter Pirolli—Xerox Palo Alto Research Center, 3333 Coyote Hill Road, Palo Alto, CA 94304.

Redefining the Focus and Context of Focus+Context Visualizations Saffan Björk & Johan Redström, PLAY, The Interactive Institute.

* cited by examiner $$F(X, \Delta t, j) = \{Z_i = (X_i * P) + (1-P) * I(i,j) | P = 0.5^{\frac{\Delta t}{\psi}}\} \quad -200$$

$$D(X,Y) = \{Z_r = (1-q)X_r + q * \sum_{\substack{\text{IS RELEATED} \\ (r,j)}} \frac{y_j}{\dim(j)}\} \quad -202$$

METHOD AND SYSTEM OF CALCULATING FOCUS ON AN ITEM

CROSS-REFERENCE TO RELATED APPLICATIONS

This application is a National Phase Application of PCT International Application No. PCT/IL2003/000686, International Filing Date Aug. 18, 2003, which claims priority of U.S. Provisional Patent Application, 60/404,133, filed Aug. 9, 2002, both of which are incorporated by reference herein in their entirety.

FIELD OF THE INVENTION

The present invention relates to a method and system of calculating focus or attention that is applied to an item among a set of items, and of diffusing focus or attention among items that are related to such item.

BACKGROUND OF THE INVENTION

An individual that observes an item within a set of items may primarily focus on, or apply attention to, a single item or a group of items at one time. Such items or groups may be deemed a focus item. Other items in the set of items that may be related to such focus item may receive some focus or attention as such focus is diffused among the focus item and the items related to it. There is a need for a method and system for calculating focus on an item and on items related to it.

BRIEF DESCRIPTION OF THE DRAWINGS

Embodiments of the invention will be understood and appreciated more fully from the following detailed description taken in conjunction with the drawings in which.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Unless specifically stated otherwise, as apparent from the following discussions, it is appreciated that throughout the specification, discussions utilizing terms such as "processing," "computing," "calculating," "determining," or the like, may refer to the action and/or processes of a processor, computer or computing system or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The processes and displays presented herein are not inherently related to any particular computer, communication device, article or other apparatus. The desired structure for a variety of these systems will appear from the description below. In addition, embodiments of the present invention are not described with reference to any particular programming language, machine code, etc. It will be appreciated that a variety of programming languages, machine codes, etc. may be used to implement the teachings of the invention as described herein.

Figure 1:
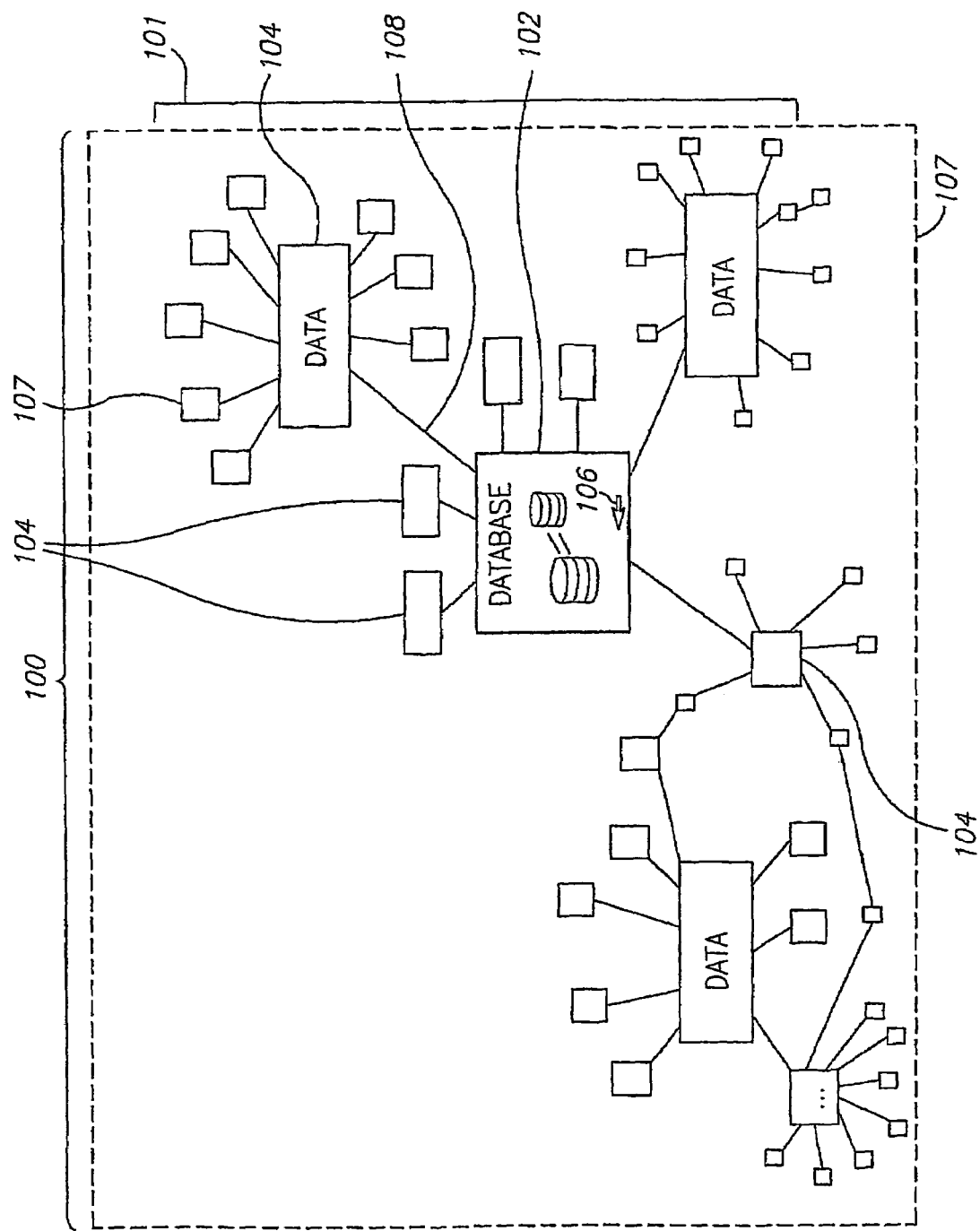
FIG. 1 depicts a set of items including a focus item and other items that may be; related to such focus item, in accordance with an embodiment of the invention.

Reference is made to FIG. 1, which depicts a set of items including a focus item and other items that may be related to such focus item, in accordance with an embodiment of the invention. The set of items 101 in FIG. 1 are representations of data fields arranged in a graph 100. In other embodiments, the set of items 101 may be, for example, representations of or the names of files or folders in a computer memory, company names in a list of companies, representations (e.g., names, icons) of people such as workers or customers, representations of products, documents, keywords, cities listed on a map, texts, numbers, pictures, sound or video streams, television shows in a programming schedule or any other set of physical, virtual or abstract items. Items may be represented on a display in graphical, textual or other formats or manners. Items may be arranged or represented differently than as shown in FIG. 1. For example, a nested directory or file folder listing may include lists of items, which may be, for example, directory or folder names, or file or other object names or representations (e.g., icons, etc.). At a point in time, an observer (not shown) may focus or apply attention to a particular item or group of items among the set of items 101. Such item, that is the subject of focus or attention may be deemed a focus item 102. A focus item 102 may be a single item or, in some embodiments, a group of items. At a different time, the focus of an observer may shift to a different item in the set of items 101, and such different item may then become the focus item 102. The various operations, computations, calculations, etc. performed on individual items according to embodiments of the invention may be performed on groups of items, which may for some purposes be treated as items. Thus a focus item or other items may be groups of items.

Focus or attention may in some embodiments be applied by for example, looking at an item, pointing to an item, mentioning an item in a conversation or in any other fashion that may be measured either in discreet or continuous units. In some embodiments, focus may be the amount of time that a cursor 106 or other computer pointing device, indicator, symbol or pointing manifestation rests on, clicks on or points to a focus item. Such cursor or other pointing device, indicator, symbol or pointing manifestation may be controlled by, for example, a joystick, mouse, keyboard, touch-screen interface etc. In some embodiments, focus may be the relative strength with which an observer presses on a joystick or other instrument that points to an item. Other ways of expressing or indicating focus and of measuring focus are also possible.

In some embodiments, there may be a relationship between a focus item and other items in a set of items 101. In some embodiments, such relationship may be expressed as a graph with nodes that represent items and (possibly directed) edges that represents relationships. Each pair of nodes may or may not be linked by one or more edges. For example, in FIG. 1, related items 104 may be collections of data that are related to the data base of focus item 102. In other embodiments, the relationship may be one of proximity on a table, chart, map or other display medium between the focus item 102 and related items 104. In an embodiment where representations of directories or folders of items are used, the hierarchical structure of such folders or files may be an example of such a relationship, such as for example, a relationship of files that are sub-files of a parent file. In still other embodiments the relationship between a focus item 102 and related items 104 may be some other characteristic shared by the focus item 102 and related items 104, such as for example, all comedy shows listed in a schedule of television programs. In some embodiments, items within a set of items 101 may be queried to find related items using for example a querying specification (such as SQL) or another information access method such as an object oriented data base. In some embodiments, lines 108 may be displayed as connecting related items 104 to a focus item 102 or to each other. FIG. 1 depicts a cursor 106, which may in some embodiments, be used as an indicator to an observer of where he is applying focus. FIG. 1 also depicts secondary related items 107 that are related to a focus item 102 through another related item 104. Lines 108 connecting items may in some embodiments be displayed as an indication of relations among items.

In an embodiment of the invention, an observer may impart or apply a quantity of focus or attention to a focus item 102 and such quantity of focus may be recorded. In some embodiments, the recording may for example be in the form of recording the quantity of time that the focus was applied to the focus item 102, such as the amount of time a viewer watched a TV program, worked on a computer file, or touched an item on a touch screen. In other embodiments, such recording may be counting the number of mouse clicks on a focus item on a computer display, the length of time that a mouse, keyboard, trackball or other pointer pointed to or was pressing on an item, the number of shares of a particular stock purchased by a trader, the amount of material processed be a manufacturing machine, the severity of a malfunction of a device, or the calls being made to a software function, etc. In some embodiments recording may be done with a microphone that may measure for example focus words used in a conversation, or other words or sounds. In some embodiments a recording device may be an eye motion tracker that may for example measure the frequency of an observer's looking at an object. Such recording may be performed manually, mechanically, electronically or by other means.

In some embodiments, a long application of focus may be broken into a number of sequential shorter events, and in yet another embodiment sequential shorter events may be combined into one long event.

In some embodiments, a focus measurement may be stored for one or more of the items in the set of items 101. In some embodiments, such measurements may be stored in a database or memory, as described below, that is associated with the item. In some embodiments, one or more units of memory may be allocated for some of, or for each of, the items in the set of items 101 so that focus measurements may be stored for such items as they are recorded or calculated. In some embodiments, such allocated memory may be in the form of an array or in another type of data structure such as for example, non-linear arrays, hash-tables, balanced trees, or other key value or data structures. In some embodiments, the focus measurement for each item in a set of items 101 may be, for example a single or double precision floating-point number or an integer, and may be implemented by continuous or discrete variables. The number of entries in the array may be the same as the number of items in the set of items 101, with a floating-point number associated with the node number i stored in the entry number i of the array. Other data storage and memory allocation systems are possible. In some embodiments, in an initial state, a focus value or focus measurement, whether 0 or greater may be stored in an array node for an item in a set of items 101. Other initial focus measurements may be used. An item may retain a focus measurement even if such item is not a focus item 102.

Figures 2, 3:
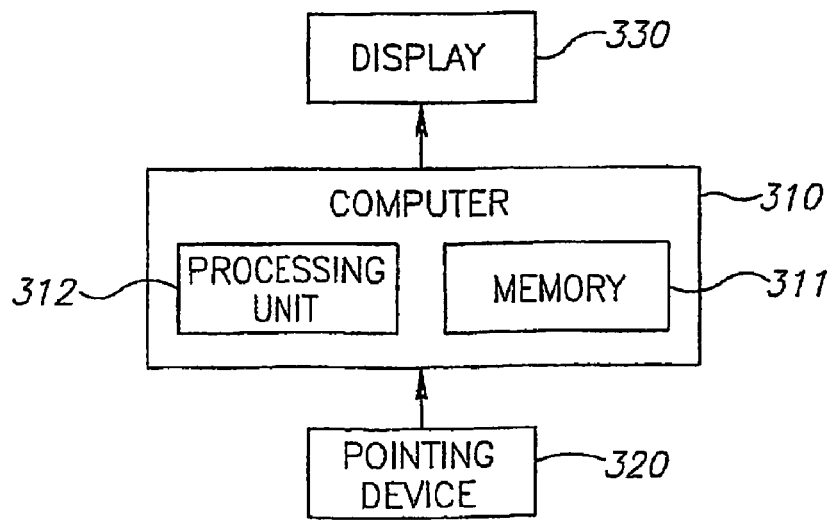
FIG. 2 sets forth certain functions employed in calculating focus measurements and context measurements in accordance with an embodiment of the invention.
FIG. 3 depicts a system for calculating and displaying focus and context measurements in accordance with an embodiment of the invention.

Reference is, made to FIG. 2, which sets forth certain functions employed in calculating focus measurements and context measurements in accordance with an embodiment of the invention. A focus measurement may in some embodiments be the degree of relevance of an item to a user. In some embodiments, the focus measurement may be used in the determination of the graphical display of an item among a set of items 101 so that an item is recognizable as particularly relevant. In some embodiments, function F( ) 200 may be used to calculate the focus measurement for a focus item 102 Xi that results from the focus recorded on such focus item 102 Xi. In operation, F( ) 200 simulates an exponential decay of focus measurements with a half-life time of tau τ. In some embodiments tau may be measured in twits of time such as seconds. In other embodiments, tau may be measured in other units. In some embodiments, fractional units other than half-life may be used, such as quarter-life, tenth life, etc. In some embodiments, focus decay value P may be derived using the quantity of focus Δt as an input, where P is exp(ln(0.5)*(Δt/τ)). Focus decay value P may be the amount of reduction of focus measurements that is applied to items in set of items 101 in response to a quantity of focus applied to a focus item 102. F( ) 200 may be used to decay the focus measurements of focus item 102 Xi and other items Xj in a set of items 101. In some embodiments, such decayed focus measurements may be calculated by multiplying P by the focus measurement stored for each focus item 102 Xi and other items Xj in a set of items 101. The amounts decayed from each focus measurement of focus item 102 Xi and other items Xj may in some embodiments be stored in an interim storage area of, for example a memory storage unit. Such amounts as were decayed from focus measurement of focus item 102 Xi and other items Xj may be added to the focus measurement of the focus item 102 Xi. The focus measurements of focus item 102 Xi and other items Xj, as altered, may in some embodiments be re-stored in the respective nodes of an array or other memory structure corresponding to each such item. As such, function F( ) 200 may in some embodiments determine the new focus measurement for focus item 102 Xi and other items Xj (such new measurements denoted as Zi) after giving effect to the application of a focus quantity on focus item Xi. The illustration of function F( ) 200 in FIG. 2 expresses the addition of decayed focus amounts to the focus measurement of focus item 102 Xi using an identity function I(i,j) that results in 1 if i is identical to j and 0 otherwise. Other methods of determining changes in focus measurements are possible. In some embodiments the sum of all focus measurements of items in set of items 101 may be 1, such that the focus measurement attributable to each item in a set is calculated as a percentage or fraction of a whole amount of focus. In other embodiments, focus amounts may be designated in other units such as for example, total number of shares traded, total viewers of a given program, etc.

In some embodiments, the focus, or a portion of the focus, of a focus item 102 Xi may be diffused over relationships or distributed among items that are related to focus item 102 Xi. In some embodiments, the calculation of diffusion of focus among focus item 102 Xi and its related items 104 Xr may be performed using Function D( ) 202 as is set forth in FIG. 2 or another suitable function, and may be deemed to yield a context measurement. A context measurement may in some embodiments be the relevance to a user of items that are related to a focus item 102. In some embodiments, the context measurement may be used in determining the graphical display of items that are related to a focus so that such related items are recognizable as particularly relevant. Function D( ) 202, may in some embodiments take as an input the focus measurements for items in a set of items 101 as such focus measurements may in some embodiments have been calculated or altered by function F( ) 200 above, or as such focus measurements may have been provided from another source.

The portion or rate of context diffusion to be spread among related items 104 Xr may in some embodiments be predetermined and may be designated as a context decay value (q).

In function D( ) 202, a related item contribution amount may be calculated for each related item 104 Xr, by, for example, adding, for other related items Yj that are related to said related item 104 Xr, the dividend of the context measurement of such other items Yj divided by the number dim(j) of such other items Yj that are related to such related item 104 Xr. For purposes of function D( ) 202, a focus item 102 Xi and each related item 104 Xr is deemed to be related to itself. Other methods of determining changes in context measurements are possible. Function D( ) 202 may reduce the context measurement of related item Xr by multiplying the existing context measurements for such item by (1−q), and adds to the context measurement of related item Xr the product of the context decay value q, times the related item contribution amount of all items related to Xr, as is described above. Function D( ) 202 may be performed on all related items 104 Xr that are related to related item 104 Xr. In some embodiments, the results of an endlessly looping of function D( ) may converge towards a final state of context, with smaller and smaller changes of context in each iteration. In some embodiments such a loop may be terminated when the context values that remain to be diffused reach a pre-designated minimum level. Function D( ) 202 determines for each related item 104 Xr the new context measurement, denoted as Zr.

In some embodiments, the sum of all context measurements and focus measurements may be, for example, 1, such that the context measurement attributable to each item in a set of items 101 is calculated as a percentage of a whole amount of focus and context. In other embodiments, context amounts may be designated in other units such as dollars, survivability of a device, etc.

In some embodiments, calculations of focus or context measurements may be performed each time a quantity of focus is applied or recorded, on a periodic, variable or fixed basis. In other embodiments, a user may dictate when or with what frequency such calculations are performed.

Reference is made to FIG. 3, a conceptual illustration of a system for calculating and displaying focus and context measurements in accordance with an embodiment of the invention. In some embodiments, a system for calculating and displaying focus and context measurements may include a computer 310 that may have a processor or processing unit 312 and one or more memories 311, such as random access memory, read only memory and/or other mass data storage capabilities. Computer 310 may include or be connected to a focus application device 320 such as for example, a mouse connected to a cursor that appears on a display, an electronic pointer, a touch screen, a joystick or other such device. Computer 310 may also include or be connected to a display 330, such as for example a standard cathode ray tube monitor, a flat screen display, a large screen display, a projector, etc. Displays on for example paper or other physical mediums are also possible. Computer 310 may be or include, for example, a personal computer, workstation, microprocessor, handheld device or other computing device.

In one embodiment of the invention, a set of items 101, or for example graphical or textual representations thereof, may be stored in computer 310 or in a memory 311 connected thereto. Computer 310 or memory 311 may also store in an array or other data structure, focus measurements for items. Processor of processor unit 312 may calculate function F( ) 200 and function D( ) 202 based on focus measurements or context measurements stored in arrays or other data structures in memory 311. Such measurements may in some embodiments be stored or retrieved or used in the calculations of a display of such items as is described below.

Referring back to FIG. 1, in some embodiments, the display of a focus item 102 or related items 104 may visually reflect the focus or context measurements of such items relative to other items. For example, a focus item 102 may in some embodiments be displayed on a computer monitor or other display 330 unit in the center or at some other point of the display 330, as a bold or large sized font or in a different color than other items or in a larger size. By way of example, in FIG. 1, focus item 102 is displayed as large and bolded while related items 104 are smaller and less bolded. Such bolding or size may vary with, for example, the context measurements attributed to such related items 104. Secondary related items 107 may be displayed as even smaller or less bolded than related items 104. In other embodiments related items may be displayed in different colors or hues of colors depending on the relative size of the focus or context measurements with which they are associated. In some embodiments, a group of secondary related items 107 that are related to a focus item 102 through a particular related item 104 may be displayed in hues of a single color to indicate their grouping as part of a unit of related item 104. In some embodiments, such hues may vary with the context measurements of such related item 104. In some embodiments, lines 108 connecting items, such as thickness, brightness, highlighting, shadow, blinking or size may be altered to reflect the organic value or content represented by the item, the relationship of the item to other items or the context or focus measurements of the item.

In some embodiments, the display format that reflects the context of focus items or related items may be updated on such display each time that focus or context measurements are updated, or at other intervals.

In some embodiments, related items 104 whose focus or context measurement is below a designated context threshold value may be filtered out and not displayed, such that a viewer sees only items whose focus or context measurements are above a context threshold value.

Figure 4:
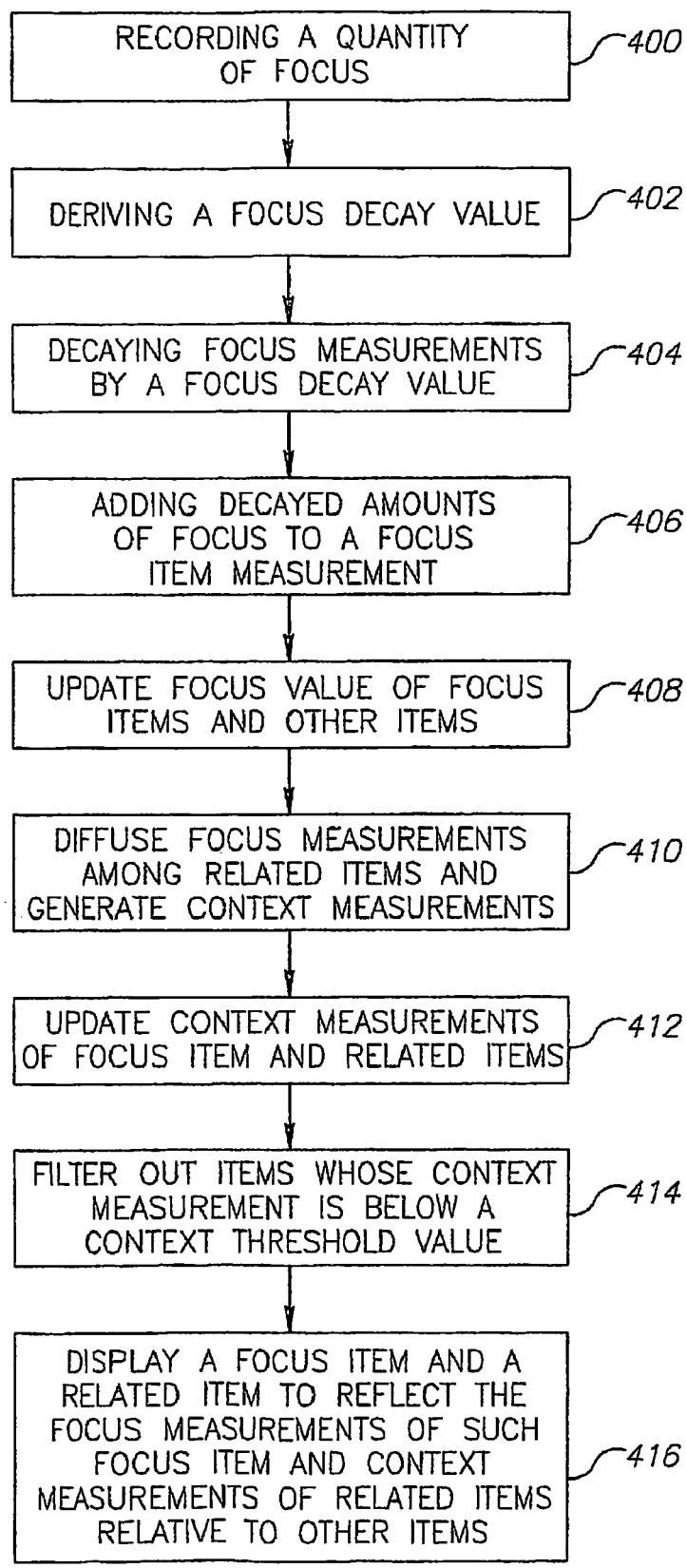
FIG. 4 depicts certain operations employed in accordance with an embodiment of the present invention.

Reference is made to FIG. 4, that depicts operations employed in accordance with an embodiment of a method of the present invention. In operation 400 a quantity of focus may be recorded. In operation 402 a focus decay value may be derived based on the recorded quantity of focus. In operation 404 the existing focus measurements of items in a set of items 101 may decayed by the decay value. In operation 406 the amounts of focus that had been decayed from all items is added to the focus measurement of focus item 102. In operation 408, focus values of a focus item 102 Xi and other items Xj may be updated. In operation 410, focus measurements are diffused among related items 104, and context measurements may be generated. In operation 412, context measurements may be updated among a focus item 102 Xi and related items 104 Xr. In operation 414 items whose context measurements are below a context threshold value are filtered out so that they will not be displayed. In operation 416 focus item 102 and related items 104 are displayed to reflect the focus measurement and context measurements of such items relative to the context measurements of other items. Other steps or series of steps may be used.

In some embodiments related items 104 may be those in proximity to a focus item 102. Proximity may mean, for example that an item is related to another item by way of a hierarchical relationship among items. For example, a focus item may be a sub-file of a related item 104, which may be a parent file in a hierarchy of files. Similarly, a focus item may be a particular node in, for example a telephone network. Related items might be for example nodes that are directly connected to such node in such telephone network.

It will be appreciated by persons skilled in the art that embodiments of the invention are not limited by what has been particularly shown and described hereinabove. Rather the scope of at least one embodiment of the invention is defined by the claims below.

We claim:

1. A method comprising:
    recording a quantity of focus applied to a focus item;
    deriving a focus decay value from said quantity;

decaying a focus measurement of said focus item and a focus measurements of at least one other item by said focus decay value;

adding amounts decayed from said focus measurement of said focus item and from said focus measurement of said at least one other item to said focus measurement of said focus item; and altering a display of said focus item to correspond to said focus measurement of said focus item.

2. A method as in claim 1, further comprising displaying said focus item in a graphical format that visually reflects said focus measurement of said focus item.

3. A method as in claim 1, further comprising diffusing said focus measurement of said focus item among at least one related item.

4. A method as in claim 3, wherein said diffusing comprises calculating a context measurement for said at least one related item.

5. A method as in claim 4, wherein said calculating includes at least:
reducing said context measurement of said at least one related item by a context decay value;
deriving a related item contribution amount for said at least one related item; and
adding the product of said context decay value times said related item contribution amount to said reduced context measurement for said at least one related item.

6. A method as in claim 5, wherein said deriving a related item contribution amount for said at least one related item comprises adding, for all other related items that are related to said at least one related item, the dividend of the context measurement of said other related items divided by the number of said other related items that are related to said at least one related item.

7. A method as in claim 4, further comprising filtering out items whose context measurement is below a threshold context value.

8. A method as in claim 4, further comprising displaying said at least one related item in a graphical format that visually reflects context measurements of said at least one related item relative to the display of other items.

9. A method as in claim 8, wherein said displaying said at least one related item relative to the display of other items comprises displaying said related item and said other items such that indications of context are expressed using one or more of size, color, boldness brightness, hue, detail and organic value.

10. A method as in claim 1, wherein said recording comprises recording a quantity of time during which focus is applied to said focus item.

11. A method as in claim 1, wherein said recording comprises recording a quantity of time during which a pointing symbol indicated focus on said focus item.

12. A method as in claim 11, wherein said pointing symbol is controlled by a device that is operably connected to a computer.

13. A method as in claim 1 wherein said recording comprises recording a discreet number of focus units.

14. A method comprising:
reducing a focus measurement of at least one item related to a focus item by a context decay value;
calculating a related item contribution amount for said at least one related item;
adding the product of said context decay value times said related item contribution amount to said reduced focus measurement for said at least one related item; and
altering a displau of said foucus item to correspond to said focus measurement of said at least one related item.

15. A method as in claim 14, wherein said calculating a related item contribution amount for said at least one related item includes at least adding, for all other related items that are related to said at least one related item, the dividend of the context measurement of said other related items divided by the number of said other related items.

16. A method as in claim 14, further comprising filtering out items whose context measurement is below a threshold context value.

17. A method as in claim 14, further comprising displaying said at least one related item in a format that reflects the context measurements of said at least one related item.

18. A method as in claim 17, comprising adjusting a size of a display of said at least one related item to reflect the context measurement of said at least one related item relative to the context measurements of other items.

19. A computing system comprising:
a data storage unit to store at least focus measurements; and
a processor:
to record a quantity of focus applied to a focus item,
to calculate a focus decay value from said quantity of focus,
to reduce said focus measurements of said focus item and focus measurements of other items by said decay value, and
to add the amounts reduced from said focus measurements to said focus measure of said focus item.

20. A computing system as in claim 19, wherein said processor is to diffuse said focus measurement of said focus item among at least one related item.

21. A computing system as in claim 20, wherein said processor is to calculate a context measurement of said at least one related item.

22. A computing system as in claim 21, comprising a display to display said at least one related item in a manner that visually reflects said context measurement of said at least one related item relative to other items.

23. A computing system as in claim 22, wherein displaying in a manner that visually reflects said context measurements includes at least displaying using one or more of size, color, boldness brightness, hue, detail and organic value.

24. A computing system as in claim 21, wherein said processor is to filter out related items whose context measurements is below a threshold context value.

25. A computing system as in claim 19, comprising a display to display said focus item in a manner that visually reflects said focus measurement of said focus items relative to other items.

26. A computing system as in claim 19, wherein said processor is to record a quantity of time during which focus is applied to said focus item.

27. A computing system as in claim 19, comprising a pointing device to apply said quantity of focus.

28. A computing system comprising:
a data storage means for storing at least focus measurements; and
a processor means for:
recording a quantity of focus applied to a focus item,
calculating a focus decay value from said quantity of focus,
reducing said focus measurements of said focus item and focus measurements of other items by said decay value, and
adding the amounts reduced from said focus measurements to said focus measure of said focus item.

* * * * *

UNITED STATES PATENT AND TRADEMARK OFFICE
CERTIFICATE OF CORRECTION

PATENT NO. : 7,509,586 B2  
APPLICATION NO. : 10/525025  
DATED : March 24, 2009  
INVENTOR(S) : Ehud Davidovich Page 1 of 1

It is certified that error appears in the above-identified patent and that said Letters Patent is hereby corrected as shown below:

Claim 14, line 9, "displau" should read --display--; "foucus" should read --focus--.

Signed and Sealed this

Sixteenth Day of February, 2010

David J. Kappos
*Director of the United States Patent and Trademark Office*

UNITED STATES PATENT AND TRADEMARK OFFICE
CERTIFICATE OF CORRECTION

PATENT NO. : 7,509,586 B2 Page 1 of 1
APPLICATION NO. : 10/525025
DATED : March 24, 2009
INVENTOR(S) : Ehud Davidovich It is certified that error appears in the above-identified patent and that said Letters Patent is hereby corrected as shown below:

Column 7, Claim 14, line 66, "displau" should read --display--; "foucus" should read --focus--.

This certificate supersedes the Certificate of Correction issued February 16, 2010.

Signed and Sealed this

Twenty-third Day of March, 2010

David J. Kappos
*Director of the United States Patent and Trademark Office*